United States Patent [19]
Yanagida

[11] Patent Number: 5,725,429
[45] Date of Patent: Mar. 10, 1998

[54] FLYWHEEL MECHANISM

[75] Inventor: Naoki Yanagida, Wilmslow, Great Britain

[73] Assignee: Exedy Corporation, Osaka, Japan

[21] Appl. No.: 289,363

[22] Filed: Aug. 11, 1994

[30] Foreign Application Priority Data

Aug. 20, 1993 [JP] Japan .................. 5-205998

[51] Int. Cl.$^6$ ........................................... F16F 15/00
[52] U.S. Cl. .................................. 464/24; 464/68
[58] Field of Search .......................... 74/574; 464/7, 464/16, 24, 64, 65, 66, 68; 192/106.2, 55.4, 208, 210, 210.1, 211, 212

[56] References Cited

U.S. PATENT DOCUMENTS

| | | | |
|---|---|---|---|
| 3,612,163 | 10/1971 | Powell | 464/84 X |
| 4,122,689 | 10/1978 | Beardmore | 464/86 |
| 4,330,029 | 5/1982 | Noll et al. | 464/97 X |
| 4,741,423 | 5/1988 | Hayen | 464/64 X |
| 5,083,981 | 1/1992 | Forster | 464/68 |
| 5,088,964 | 2/1992 | Kuhne | 464/68 |
| 5,249,659 | 10/1993 | Fukushima | 74/574 X |
| 5,353,664 | 10/1994 | Yamamoto | 74/574 X |
| 5,367,921 | 11/1994 | Fukushima | |

FOREIGN PATENT DOCUMENTS

| | | | |
|---|---|---|---|
| 43 35 519A | 4/1993 | Germany | |
| 2 137 309 | 10/1984 | United Kingdom | 464/66 |

Primary Examiner—Daniel P. Stodola
Assistant Examiner—William A. Rivera
Attorney, Agent, or Firm—Shinjyu Office of Patent Attorneys

[57] ABSTRACT

A flywheel assembly having a first flywheel, a second flywheel, a viscous damper mechanism (3) disposed therebetween, and a boss member (5). The second flywheel is supported on the first flywheel so as to be relatively rotatable via the viscous damper mechanism. The viscous damper mechanism (3) includes disc-shaped plates (9), each having radially inner serrations (9d) on radially inner surface thereof. The boss member (5) has radially outer serrations (5a). The boss (5) and plates (9) are provided with a thermal expansion differential prior to assembly. After assembly, the serrations (5a) on the boss securely engage the serrations (9d) on the inner surface of the plates (9). The plates (9) may be heated or the boss (5) may be cooled to provide a thermal expansion differential.

5 Claims, 4 Drawing Sheets

FLYWHEEL MECHANISM

BACKGROUND OF THE INVENTION

The present invention relates generally to a flywheel mechanism and a method of assembling the flywheel. More specifically, the present invention relates to a flywheel mechanism having a viscous vibration damping mechanism wherein, in one embodiment, portions of the flywheel mechanism are assembled using thermal expansion and contraction to insure a secure fit.

Flywheel assemblies having a split flywheel construction with a damping mechanism disposed between a first and a second flywheels are becoming well known in, for example, automotive applications. Typically, the first flywheel is connected to the crankshaft of an internal combustion engine, and a clutch is mounted on the second flywheel. The first flywheel and the second flywheel are connected to each other for limited rotary displacement by the viscous damper mechanism. If torsional vibration is transmitted to the first flywheel, the viscous damper mechanism damps torsional vibration thus limiting the amount of vibration transmitted to the second flywheel.

In some flywheel designs, the viscous damper mechanism typically includes at least one plate having a central bore formed with wave-shaped serrations or large gear teeth that engage a boss or hub formed with corresponding serrations or gear teeth on its outer radial surface. The second flywheel is typically connected to or formed integrally with the boss or hub. The two serrated surfaces or gear teeth engage one another, whereby the plate and the second flywheel integrally rotate. Torque is thus transmitted from the first flywheel to the second flywheel through the viscous damper mechanism.

During the assembly method of the above described flywheel assembly, the plate and the boss are coupled to each other by merely inserting the boss into the central bore of the plate. In order to assemble the boss and the plate, a clearance is included in the dimensions of the serrated surfaces to allow for easy assembly of the parts. After assembly of the flywheel assembly, the clearance between the serrated surfaces becomes backlash whereby there is typically a minimal but slight relative movement between the two serrated surfaces.

A flywheel by its very nature, is subjected to extreme dynamic forces, such as centrifugal forces, as the flywheel rotates, changes speed, stops and starts rotating. After extended use of the flywheel assembly, the backlash between the two serrated surfaces can increase due to wear, deformation or metal fatigue. As a result of an increase in backlash, engagement between the two serrated surfaces can cause an undesirable sound due to continuous engagement and disengagement between the serrated surfaces. The sound created can be transmitted throughout the vehicle in which the flywheel is installed. Further, as the serrated surfaces further engage one another, the backlash can become greater through wear, and the sound can become louder. Such sounds are distressful in automotive applications, where noises disturb a driver's peace of mind and confidence in the vehicle.

In some flywheel designs, serrated surfaces, such as those described above, have been plated to provide a hardened surface or the like, to reduce the damage to the serrated surfaces caused by the relative movement of engaging surfaces having a small backlash. However, most plating processes involve specialized equipment and resources which are cost prohibitive and are thus undesirable in a manufacturing process.

SUMMARY OF THE INVENTION

One object of the present invention is to minimize the clearance and backlash between a radially inner serrated surface of a plate of a damping mechanism in a flywheel assembly and a radially outer serrated surface of a boss which is inserted into the plate so that the two serrated surface engage one another.

In one aspect of the present invention, a flywheel assembly includes a first flywheel which is connectable to the crankshaft of an internal combustion engine, a viscous fluid damping mechanism connected to the first flywheel, the damping mechanism having at least one plate, a hub or boss coupled the plate and a second flywheel coupled to the hub for limited rotary displacement with respect to the first flywheel.

The hub includes a plurality of serrations formed on an outer radial surface thereof. The plate is formed with a central bore or aperture having a plurality of serrations on an inner radial surface thereof corresponding to the serrations on the hub. During assembly of the flywheel mechanism, the hub is inserted into the bore of the plate such that the two serrated surfaces engage one another. Prior to insertion of the hub, the hub and plate are provided with a temperature differential so that either the hub is in a thermally contracted state or the plate is in a thermally expanded state. After insertion of the hub into the bore of the plate, the plate and the hub subsequently heat or cool to approximately the same temperature. Due the expansion or contraction of the parts, a firm engagement between the two parts is achieved.

The clearance between the two serrated surfaces or teeth is decreased due to the assembling the parts using a thermal expansion differential. Therefore, sound obtained by engagement between the two serrated surfaces is decreased or eliminated.

The foregoing and other objects, aspects and advantages of the present invention will become more apparent from the following detailed description.

DESCRIPTION OF THE PREFERRED EMBODIMENTS

Figure 1:
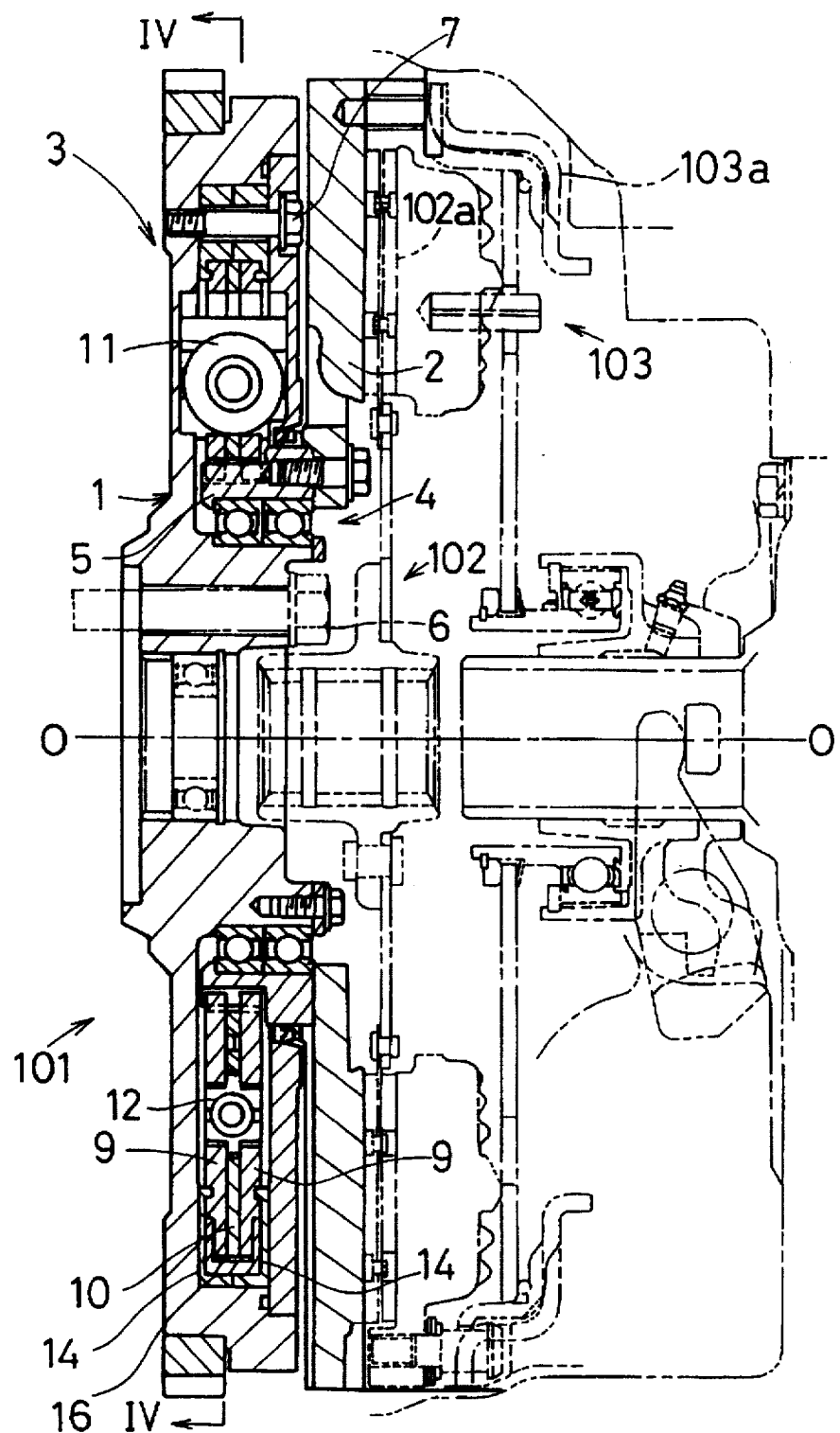
FIG. 1 is a schematic cross-section showing a flywheel assembly of one embodiment of the present invention.

In FIG. 1, a power transmission apparatus includes a flywheel assembly 101, a clutch disc 102, and a clutch cover assembly 103 (shown in phantom in FIG. 1).

Figure 2:
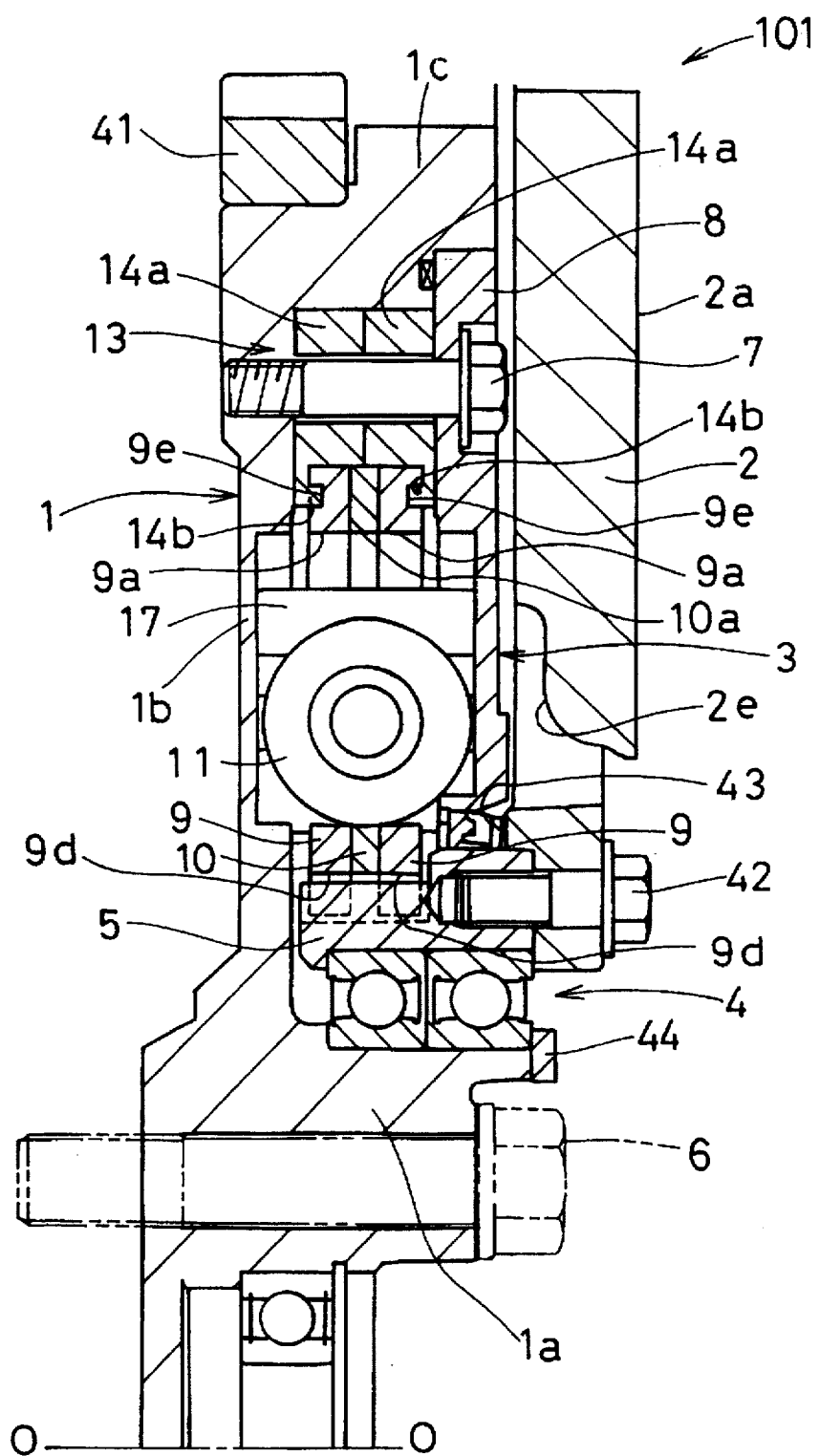
FIG. 2 is a partial section of a portion of FIG. 1, on an enlarged scale.
Figure 3:
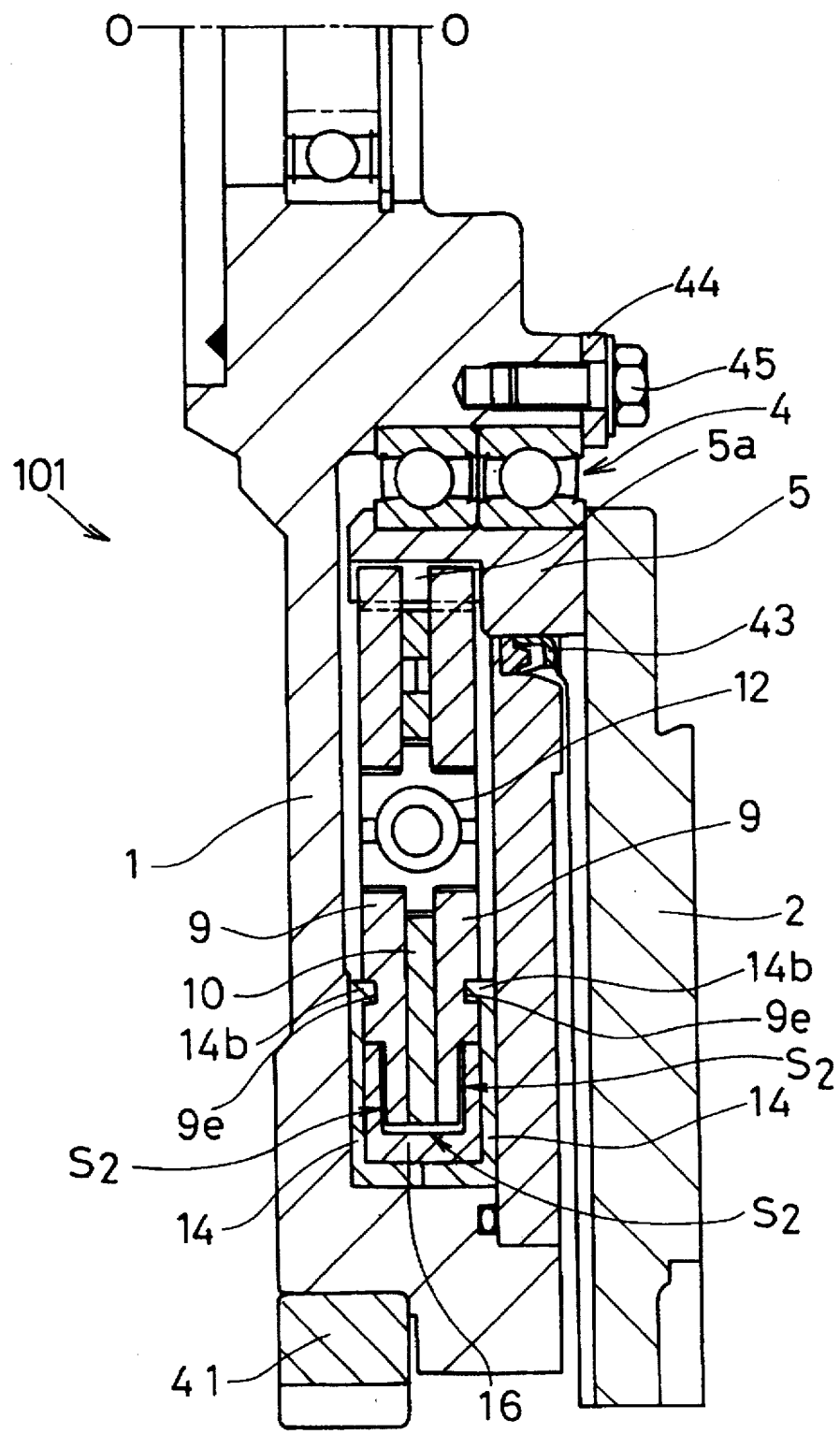
FIG. 3 is partial section of another portion of FIG. 1, on an enlarged scale.
Figure 4:
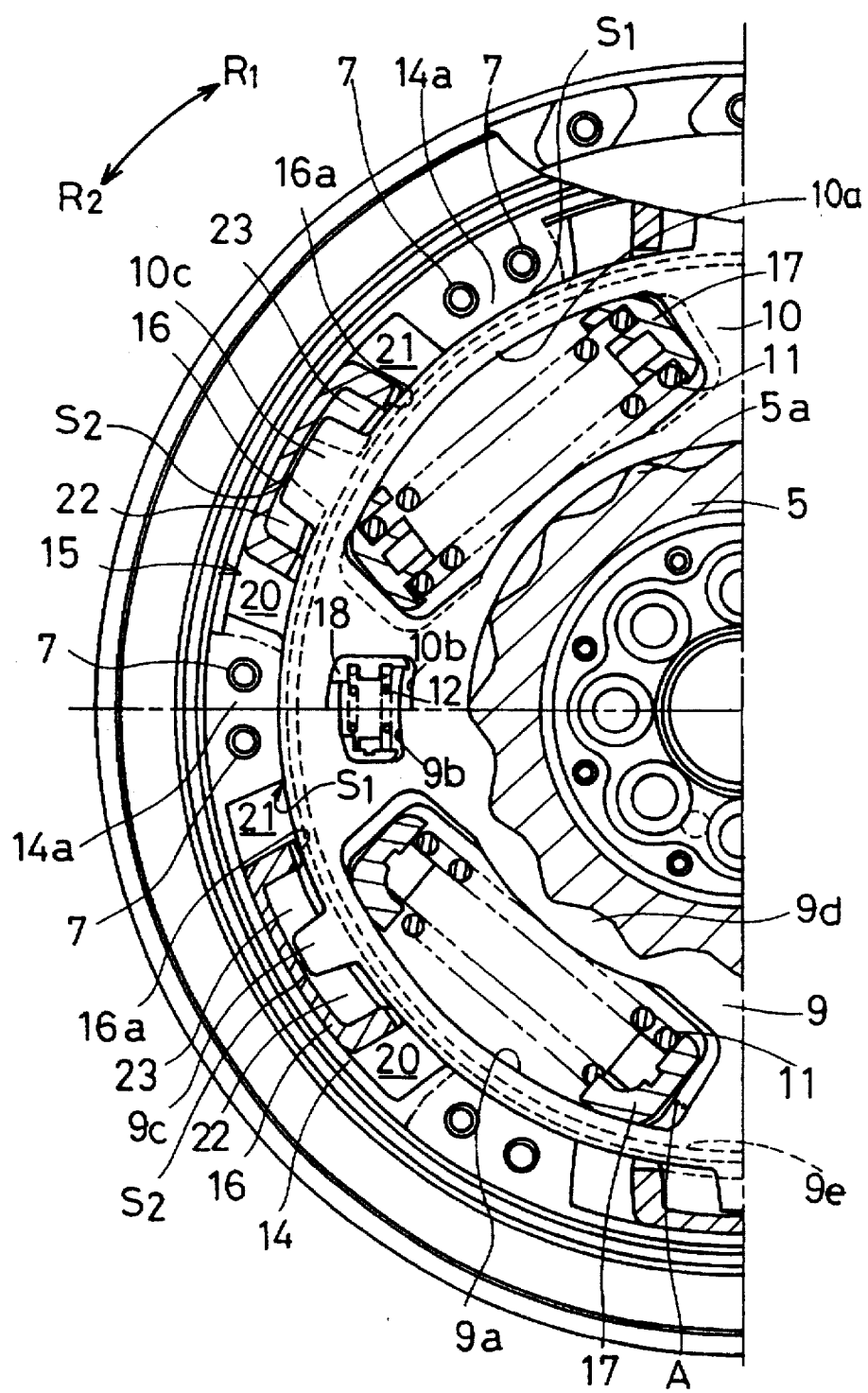
FIG. 4 Is a cross section taken along a line IV—IV in FIG. 1, looking in the direction of the arrows.

In FIG. 2 to 4, the flywheel assembly 101 mainly comprises a first flywheel 1, a second flywheel 2, and a viscous damper mechanism 3 disposed between the two flywheels. The first flywheel 1 is fixed to an end of a crankshaft of an engine (not shown) by a bolt 6. The second flywheel 2 has a friction surface 2a against which a friction member 102a of the clutch disc 102 (see FIG. 1) is pressed on the right side of FIG. 2. In addition, a clutch cover 103a of the clutch cover assembly 103 (see FIG. 1) is fixed to a radially outer portion of the second flywheel 2 on the side of the friction surface 2a.

The first flywheel 1 is a substantially disc-shaped member, and is composed of a boss 1a extending toward a transmission (rightward in FIGS. 1 to 3), a disc 1b integrally formed from the boss 1a, and a rim 1c extending toward the transmission from a radially outer portion of the disc 1b. Two rolling bearings 4 arranged in the axial direction are mounted on a radially outer portion of the boss 1a. Radially inner ends of the rolling bearings 4 are locked by a ring plate 44 fixed to the boss 1a by a bolt 45 (see FIG. 3).

An annular boss member 5 is provided in radially outer portions of the rolling bearings 4. A wave-shaped radially outer serration 5a (shaft-side teeth) is formed in a radially outer portion of the boss member 5 on the engine side (the left side in FIGS. 1 to 3), as apparent from FIG. 4.

The second flywheel 2 is a substantially disc-shaped member, and has its radially inner portion fixed to the boss member 5 by bolts 42. Formed in the radially inner portion of the second flywheel 2 is a hole 2e which allows for communication between the viscous damper mechanism 3 and the clutch disc 102. A ring gear 41 is fixed to a radially outer portion of the first flywheel 1 by, for example, shrinkage fit by heating.

Description is now made of the viscous damper mechanism 3. The viscous damper mechanism 3 is mainly composed of a disc-shaped drive plate 8, a pair of first driven plates 9, a second driven plate 10 interposed between the two first driven plates 9, a first coil spring 11 and a second coil spring 12 for elastically connecting the first flywheel 1 and the drive plate 8 to the first and second driven plates 9 and 10 in the circumferential direction, respectively, and a viscous damping part 13 for damping torsional vibration by the viscous resistance of fluid. An annular chamber 15, (FIG. 4) is defined by the first flywheel 1, the drive plate 8 and the boss member 5. The annular chamber 15 is filled with viscous fluid. A radially outer end of the drive plate 8 is fixed to the rim 1c of the first flywheel 1 by a plurality of bolts 7. An annular sealing member 48 is disposed between a radially inner end of the drive plate 8 and the radially outer portion of the boss member 5 thus sealing the annular chamber 15.

The pair of first driven plates 9 (depicted in the lower half of FIG. 4) has four first window holes 9a and two second window holes 9b formed in its radially intermediate portion. The first window hole 9a extends in the circumferential direction, as apparent from FIG. 1. The second window hole 9b is a small window hole having a circumferential length which is approximately one-fourth that of the first window hole 9a. The first coil spring 11 is accommodated in the first window hole 9a. Although spring sheets 17 are disposed at both ends of the first coil spring 11, a predetermined clearance A is ensured between the spring sheets 17 and both circumferential end surfaces of the first window hole 9a when there is no relative displacement between the plates 9 and 10, or in other words, there is no torsional stress imposed upon the flywheel assembly 101.

Projections 9c are formed with equal spacing in the circumferential direction in a radially outer portion of the first driven plate 9. Further, annular grooves 9e are respectively formed in radially outer portions on axially outer surfaces of both the first driven plates 9.

A radially inner portion of the first driven plate 9 is formed with serrations 9d which engage the radially outer serrations 5a of the boss member 5, whereby the first driven plate 9 and the boss member 5 rotate as a single unit. The boss member 5 and the plate 9 are coupled to each other by inserting the boss member 5 into the radially inner portion of the first driven plate 9 in a state where the first driven plate 9 is expanded by heating, that is, by shrinkage fit by heating. Therefore, a clearance between two opposing serrations is minimized.

The second coil spring 12 disposed in the second window hole 9b has spring sheets 18 at both its ends. The spring sheets 18 abut against both circumferential ends of the second window hole 9b when there is no relative displacement between the plates 9 and 10, or in other words, there is no torsional stress impressed upon the flywheel 101.

The second driven plate 10 (depicted in the upper half of FIG. 4) has a first window hole 10a and a second window hole 10b at positions corresponding to the first and second window holes of the first driven plate 9. The first window hole 10a is shorter in the circumferential direction than the first window hole 9a of the first driven plate 9, and both circumferential ends of the first window hole 10a abut against spring sheets 17 when there is no torsional stress impressed upon the flywheel 101. The second driven plate 10 has projections 10c in portions respectively corresponding to the projections 9c of the first driven plate 9. The projection 10c is made wider in the circumferential direction than the projection 9c. Since the inner diameter of the second driven plate 10 is made larger than the outer diameter of the boss member 5, the second driven plate 10 and the boss member 5 are not engaged with each other.

Radially outward of the first and second driven plates 9 and 10, an annular housing 14 is disposed. An annular fluid chamber 15 which is filled with viscous fluid is formed in the housing 14. The radially outer portions of the first and second driven plates 9 and 10 extend outwardly into the annular fluid chamber 15 from a radially inner portion of the housing 14.

A plurality of weirs 14a are formed with predetermined spacing in the circumferential direction inside the housing 14. The weirs 14a divide the annular fluid chamber 15 into a plurality of sets of chambers 20 and 21. The outer circumferential surface of the plates 9 and 10 and the inner radial surface of the weirs 14a form main chokes $S_1$. The main chokes $S_1$ restrict fluid flow between the chambers 20 and 21.

The bolts 7 are respectively inserted into holes formed in the weir 14a, extend into the flywheel 1c. The housing 14 rotates integrally with the first flywheel i and the drive plate 8 via the bolts 7.

Opposing annular projections 14b (FIG. 2) extending axially towards each other are formed on a radially inner end of the housing 14. The projections 14b are respectively fitted in the annular grooves 9e formed in the first driven plates 9, thereby providing at least a partial seal along the radially inner portion of the annular fluid chamber 15.

Sliders 16 are disposed so as to be circumferentially slidable in the annular fluid chamber 15. The slider 16 is formed in the shape of a box opening inward, and a radially outer wall of the slider 16 is in the shape of a circular arc along a radially outer wall of the housing 14. Notches 16a through which fluid can pass are formed in radially inner portions of both circumferential ends of the slider 16.

The sliders 16 are respectively disposed so as cover the projections 9c and 10c of the first and second driven plates 9 and 10. Each of the projections 9c and 10c further defines the large division chamber 20 and the second large division chamber 21, and divides a portion inside the slider 16 into a first small division chamber 22 and a second small division chamber 28. Further, sub-chokes $S_2$ through which viscous fluid can pass between both the small division chambers 22 and 28 are respectively formed between the projections 9c and 10c and inner surfaces of the sliders 16. The flow passage cross-sectional area of the sub-choke $S_2$ is larger than the flow passage cross-sectional area of the main choke $S_1$.

Description is now made of operation of the flywheel assembly.

If torque is inputted to the first flywheel 1 from the crankshaft of the engine (not shown), the torque is transmitted to the second flywheel 2 through the first and second coil springs 11 and 12 of the viscous damper mechanism 3, the boss member 5 and the like. If torsional vibration is transmitted to the first flywheel 1, the first and second coil springs 11 and 12 repeatedly expand and contract, whereby viscous resistance is created in the viscous damping part 13 to damp the torsional vibration.

If torque is transmitted to the first flywheel 1, the first flywheel 1 and the drive plate 8 start to rotate relative to the second flywheel 2. The first flywheel 1 and the drive plate 8 rotate the second driven plate 10 through the first coil spring 11. Consequently, the second coil spring 12 is compressed between the second driven plate 10 and the first driven plate 9, to obtain low rigidity. Suppose the first flywheel 1 and the drive plate 8 rotate in the direction of rotation $R_2$ at this time. In this case, the slider 18 is similarly moved in the direction of rotation $R_2$. Therefore, the first small division chamber 23 is compressed and at the same time, the first small division chamber 22 is enlarged. Specifically, fluid in the second small division chamber 23 flows to the first small division chamber 22 through the sub-choke $S_2$. Since the flow passage cross-sectional area of the sub-choke $S_2$ is large, small viscous resistance is created. Low rigidity and small viscous resistance are thus exerted in the range of a small torsional angle.

If the torsional angle in the direction of rotation $R_2$ is increased, ends of the slider 16 in the direction of rotation $R_1$ abut against each of the projections 9c and 10c. This blocks up the notch 16a, whereby the sub-choke $S_2$ stops functioning. Further, the spring sheet 17 of the first coil spring 11 in the direction of rotation $R_2$ abuts against an end of the first window hole 9a of the first driven plate 9 in the direction of rotation $R_2$. Thereafter, the first coil spring 11 is compressed between the first flywheel 1 and the drive plate 8 and the first driven plate 9, to obtain high rigidity. High rigidity and large viscous resistance are thus exerted in the range of a large torsional angle.

When small torsional vibration (for example, combustion fluctuations) is produced in a state where the first flywheel 1 and the drive plate 8 rotate through a predetermined angle relative to the first driven plate 9, the slider 16 separates from each of the projections 9c and 10c, whereby the sub-choke $S_2$ functions.

As described in the foregoing, at the time of the relative rotation between the first flywheel 1 and the second flywheel 2, the radially inner serration 9d of the first driven plate 9 and the radially outer serration 5a of the boss member 5 are coupled to each other by shrinkage fit by heating as is described below. Therefore, a clearance therebetween is minimized, thereby to make it difficult to produce a sound obtained by striking the teeth.

Description is made of a method for assembling the above described flywheel.

The pair of first driven plates 9 and the second driven plate 10 are first temporarily fastened to each other in a state where the second driven plate 10 is interposed between the first driven plates 9. Next, the driven plates 9 and 10 are expanded by heating, causing them to experience thermal expansion. The plates are heated to a temperature such that the difference in the temperature between the plates 9 and the boss member 5 is generally in the range of 50° to 130° C. The boss member 5 is then inserted into the radially inner portion of the first driven plates 9. Subsequently, the first driven plates 9 cool and shrink, whereby the radially inner serrations 9d closely adhere to the radially outer serrations 5a. The backlash between the radially outer serration 5a and the radially inner serration 9d is generally in the range of 0.004 to 0.030 nm.

The boss member 5 and both the driven plates 9 and 10 thus coupled to each other are mounted on the first flywheel 1. The housing 14 and the first and second coil springs 11 and 12 are further mounted thereon. The drive plate 8 is fixed to the first flywheel 1 by the bolts 7. The sealing member 43 is mounted between the radially inner portion of the drive plate 8 and the radially outer portion of the boss member 5, to complete the viscous damper mechanism 3. The second flywheel 2 is fixed to the boss member 5 by the bolt 42.

In an alternate embodiment, a method of assembly includes cooling the boss member 5 thus causing it to experience thermal contraction. The boss member 5 is then inserted into the center of the plates 9 and 10, to couple the boss member 5 to the radially inner portions of the first driven plates 9. The clearance between the radially inner serration 9a of the first driven plate 9 and the radially outer serration 5a of the boss member 5 is minimized. The cooling temperature of the boss member 5 is such that the difference in temperature between the boss member 5 and the plates 9 is in the general range of 15° to 25° C.

Furthermore, the present invention can be also employed for a case where the second flywheel 2 and the boss member 5 are integrally formed. In this case, the viscous damper mechanism 3 is previously assembled on the first flywheel 1, after which the cooled boss of the second flywheel 2 is coupled to the radially inner portions of the first driven plates 9.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A flywheel assembly comprising:
   a first flywheel connectable to the drive shaft of an engine;
   a bearing mounted to a central portion of said first flywheel;
   a boss mounted to said bearing concentric with said flywheel, said boss formed with a plurality of serrations on an outer radial surface thereof;
   a viscous fluid damping mechanism coupled to said first flywheel having a pair of first disk shaped plates formed with a central aperture, said central aperture formed with a plurality of serrations engaged with said serrations on said boss; and
   a second disk shaped plate having a central aperture through which said boss extends, said second plate being rotatable relative to said boss, said second plate disposed between said pair of first disk shaped plates, a portion of said second disk shaped plate extending into said viscous fluid damping mechanism;
   wherein said serrations on said pair of first disk shaped plates and said serrations on said boss are closely adhered to one another to maintain relative position between said pair of first disk shaped plates and said second disk shaped plate such that said second disk shaped plate rotates between and relative to said pair of first disk shaped plates;

wherein said viscous fluid damping mechanism defines an annular chamber, said annular chamber having at least one slider element disposed therein, said slider element defining at least two chambers in said annular chamber; and said second disk shaped plate is formed with at least one first protrusion extending into said slider, said first protrusion defining a first and second small division chamber within said slider, each of said pair of first disk shaped plates is formed with at least one second protrusion which extends into said slider, and said first protrusion is larger than said second protrusion in a circumferential direction.

2. A flywheel as set forth in claim 1, further comprising a second flywheel connected to said boss for limited rotary displacement with respect to said first flywheel.

3. A flywheel as set forth in claim 2 wherein said viscous fluid damping mechanism further comprises at least two fluid filled chambers and a choke formed therebetween for restricting fluid flow between said chambers in response to relative displacement between said first and second flywheels.

4. A flywheel as set 1, wherein said boss and said plate include a backlash therebetween generally in the range of 0.004 to 0.030 nanometers.

5. The flywheel assembly as in claim 1, wherein said viscous fluid damping mechanism includes an arcuate annular housing formed with opposing annular projections; and said pair of first disk shaped plates are formed with annular grooves into which said annular projections extend, providing a seal for said annular chamber.

* * * * *